Figure 3:
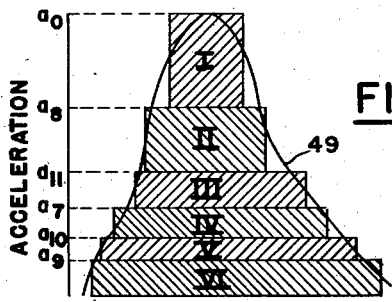

Nov. 30, 1948.  C. H. GROGAN ET AL  2,454,793
SHOCK GAUGE
Filed July 18, 1944

INVENTORS
CHARLES E. CREDE
CHARLES H. GROGAN
BY
Attorney

Patented Nov. 30, 1948

2,454,793

UNITED STATES PATENT OFFICE 2,454,793

SHOCK GAUGE

Charles H. Grogan, West Falls Church, Va., and Charles E. Crede, Winchester, Mass.

Application July 18, 1944, Serial No. 545,529

4 Claims. (Cl. 73—12)

(Granted under the act of March 3, 1883, as amended April 30, 1928; 370 O. G. 757)

The subject invention relates to shock gages for measuring the acceleration imparted to rigid structural units which are subjected to shocks, such as gun barrel slides or mounts, railway apparatus, pile drivers, rolling mills, etc.

Various types of equipment used aboard a warship, e. g., have to withstand shocks of rather high magnitude. The designer of this equipment is therefore required to know the nature and magnitude of the shock. Knowledge of the magnitude of the shock is also required in the design of shock mounting and in formulating laboratory tests for testing the equipment developed. Shock is usually evaluated by measuring either the acceleration, the velocity or the displacement as a function of time. These characteristics can be measured with a reasonable degree of accuracy with existing instruments, but the required apparatus is ordinarily rather bulky, including much electronic gear, such as the oscillograph and amplifiers. It requires considerable time to set up for operation; it gets out of order easily; and it requires skilled operators to enable it to function properly. Such apparatus is therefore not generally satisfactory for use in field tests where ruggedness and lack of complexity are prime requisites for testing equipment.

Many simple instruments for measuring shock have been devised for particular use on ship board tests. Some of these include mass load tensile specimens which are broken by the application of a sufficient acceleration; spring loaded electrical contacts which are operated to actuate an electric circuit; a lead strip and a steel ball in which the steel ball indents the lead when the assembly is accelerated; and numerous other similar devices. These devices all work upon the well-known principle that if a force acting upon a known mass can be measured, the acceleration which results from such force can be determined. In the instruments mentioned the force was that necessary to break a tensile specimen, to cause contacts to break, or to indent the piece of lead. This principle is entirely rigorous for measuring acceleration, but unfortunately acceleration alone does not constitute shock. It is necessary to know the duration of the acceleration and in this consideration the instruments which measure acceleration alone are not satisfactory for evaluating the shock. These facts lead to the development of the shock gage which will be described in the following paragraphs, and to the specific modification thereof which is the subject of the present invention, a description of which is included in the application of one of the present joint inventors Charles E. Crede, Serial No. 543,484, filed July 4, 1944.

An object of this invention is to construct an instrument of the type hereinafter disclosed, having an improved arrangement of cylinders and a modified means for indicating the maximum displacement, during a shock, of the masses resiliently held in the ends thereof.

A further object is to construct an instrument of the type referred to, having its cylinders arranged annularly in a compact body, their axes being parallel to each other and to the longitudinal axis of the body, and wherein the maximum displacement of the masses is indicated by depressions made in surfaces of deformable material by obtuse conical ends on the masses.

Figure 2:
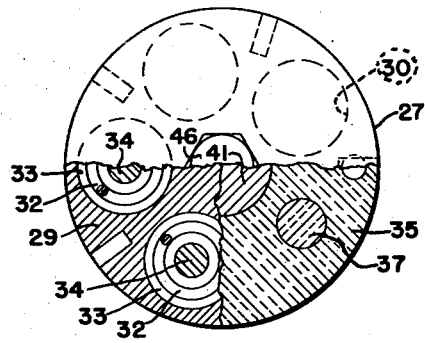
Figure 4:
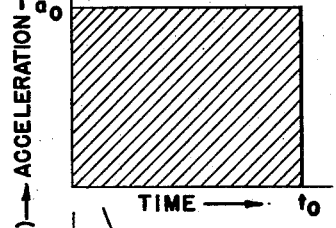
Figure 5:
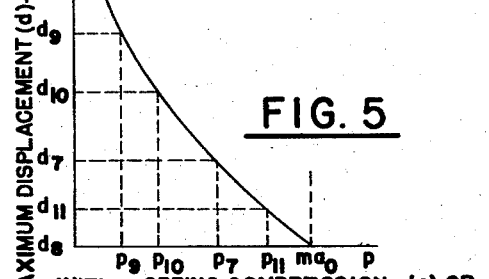
Figure 6:
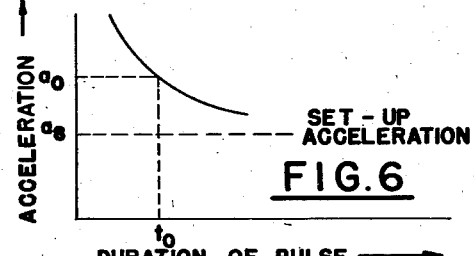
Figure 7:
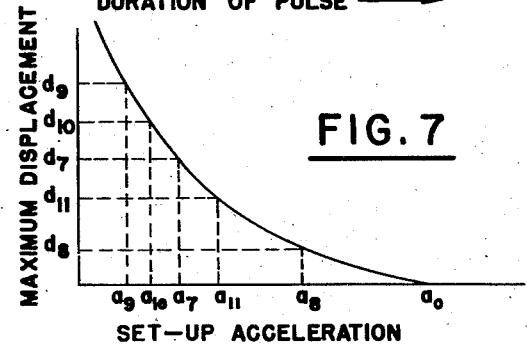
Figure 1:
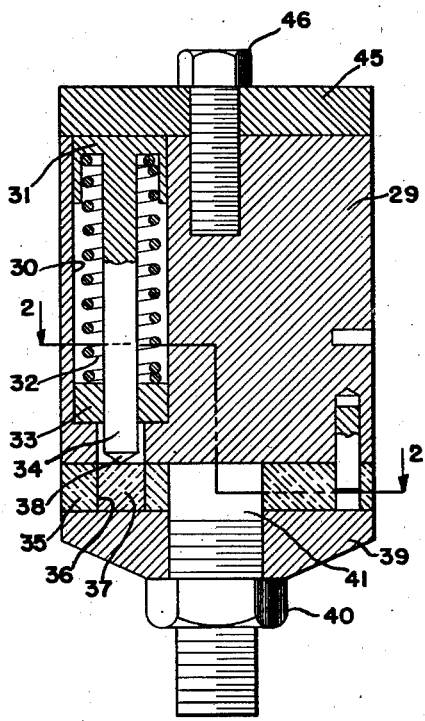

Other and more specific objects will become apparent in the following detailed description accompanied by the drawings, wherein:

Fig. 1 is a central section taken along the longitudinal axis of one form of instrument constructed in accordance with the present invention, Fig. 2 is a plan view thereof, partly in section, along the lines of 2—2 of Fig. 1, Fig. 3 illustrates how the actual acceleration-time curve of the shock measured might appear when developed from the values obtained in Fig. 7 with the aid of curves of the type shown in Fig. 6 made up for the different displacements of the masses in the instrument, Fig. 4 is an acceleration-time diagram illustrating a theoretical square pulse, Fig. 5 shows how the maximum acceleration transmitted to the instrument may be determined, Fig. 6 illustrates an acceleration-duration curve for a particular mass displacement $d$, which will satisfy the equation $d = \frac{1}{2} at^2$, and Fig. 7 is a displacement-acceleration curve plotted in accordance with one set of values obtained from the instrument in a test, showing how the curve is extended to the zero displacement coordinate to determine the maximum acceleration, The principle on which this gage operates is explained by means of the diagrams in the drawings, Figs. 3 through 7.

In making a test to determine the characteristics of any shock the instrument is rigidly mounted on the unit to which the shock is imparted, in a position so that the axis of the cylinders are parallel to the direction of the shock.

The shock gage shown in Figs. 1 and 2 is the subject of the present invention and operates on the same principle as explained in the prior Crede application referred to above, but an improved arrangement of parts and a modified scheme for indicating the maximum displacements of the masses are used. The block 29 is cylindrical and has five vertically extending bores 30, each fitted with a piston or mass 31, a helical spring 32, and a spacer 33 which is utilized to vary the initial spring compression. Each piston includes a pointer stem 34 extending downwardly through the spring and through the spacer. A Bakelite disk 35 is clamped to the block and includes bores 36 lined up with the axis of each piston. Each bore in the Bakelite disk is filled with modeling clay or some other deformable material 37 so that a downward movement of the piston relative to the block produces a permanent indention in the clay surface with negligible resistance. The lower end of the pointer 34 is in the form of an obtuse cone 38 so that the depth of the impression can be determined by measuring its diameter.

The body or casing 29 has a bolt 41 extending from its base, for holding the Bakelite disk in place by means of the supporting plate 39 and nut 40. This bolt may also serve as a means for mounting the instrument on the object subjected to the shock. The upper end of casing 29 is closed by plate 45 held in place by bolt 46.

Assume now, as explained in the previous Crede application above referred to, that the body of the gage is subjected to a shock which for purposes of simplicity can be assumed as the square pulse shown on the acceleration-time diagram of Fig. 4. This will move the body of the gage upwardly at an acceleration ($a_0$) for a time interval ($t_0$). The relation between the applied acceleration pulse and the magnitude of the initial spring compression may be such that the lowest positions reached by each of the masses are of certain magnitudes, as may be indicated by the diameters of the respective depressions. As mentioned above, means are provided for determining the lowest position reached or maximum displacement of each mass by measuring the diameters of these depressions. Calling the maximum displacement of each mass $d$, the curve shown in Fig. 5 may be plotted. The coordinates of this curve are the initial spring compressions $p$ as abcissae and the maximum displacements $d$ of each mass as ordinates.

It will be seen from Fig. 5 that as the initial spring compression is increased the maximum displacement of the mass is decreased. If the product of the initial spring compression and the inverse of the mass supported upon the spring barely exceeds the applied acceleration ($a_0$) the maximum displacement $d$ of the mass will be infinitesimally small. A curve drawn through the displacement points in Fig. 5 extended to the horizontal axis intersects this axis at some value ($p_0$) of spring compression which when divided by the mass which the spring supports gives the magnitude of the applied acceleration ($a_0$).

Assume that the gage is subjected to any unknown square pulse. The initial spring compression for any mass is known from the set-up of the several springs on the pistons or masses of the gage and the maximum displacement of each mass is determined by the depression means provided as part of the gage. Such a displacement could have been caused by any one of an infinite number of combinations of acceleration with time, either a high acceleration lasting for a short time or a low acceleration lasting for a long time. The various combinations of acceleration and time which could have produced this displacement are plotted in Fig. 6. Since the magnitude of the acceleration ($a_0$) was determined from Fig. 5 by the intersection of the curve with the horizontal axis, the duration ($t_0$) of this acceleration can be determined from the curve of Fig. 6.

The above paragraph described the operation of the subject gage for measuring square pulse shocks. A square pulse shock almost never occurs in practice but the gage may be used to evaluate any shock to the desired approximations by dividing it into a series of square pulses. For example, the gage is subjected to a shock and a curve as shown in Fig. 7 is plotted from the gage readings. The maximum acceleration ($a_0$) is determined as previously described. Now consider some acceleration ($a_8$) which is determined by the initial compression in one of the springs (supporting the mass backed by the spring having been set up to the lowest tension). If the applied acceleration is less than ($a_8$), the displacement of the respective mass is zero but if the applied acceleration is greater than ($a_8$) the maximum displacement ($d_8$) of the mass is determined by duration of the applied acceleration and the amount by which it exceeds ($a_8$). Fig. 7 is used to determine ($a_0$) and the duration of the pulse I can be determined from a curve of the type shown in Fig. 6. Now consider some lower acceleration ($a_{11}$). The maximum displacement ($d_{11}$) is caused by the pulse I (of known size) shown in Fig. 3 plus the pulse II of heretofore unknown size. Since the displacement ($d_{11}$) is recorded by the gage the pulse II can be determined. In a similar manner each successive square pulse III, IV, V, and VI, respectively can be calculated and a smooth curve 49 drawn through the pulses indicates the actual pulse. The accuracy of the method is determined by the size of the increments taken. The acceleration-time curve which results defines the shock to which the gage was subjected.

Altho Figs. 1 and 2 show one form of the modified construction and arrangement of parts used, obvious changes in dimensions and proportions of parts might be made without departing from the spirit and scope of this invention, as defined in the appended claims.

The invention described herein may be manufactured and used by or for the Government of the United States of America for governmental purposes without the payment of any royalties thereon or therefor.

What is claimed is:

1. A shock gage comprising a body, non-resistably deformable material inserts therein, a series of masses each having an end in contact with said material, resilient means exerting different forces in one direction on the several masses, whereby the sizes of the depressions said ends make in the surface of said material due to displacement of each of the several masses during a shock constitute a measure of said shock.

2. A shock gage comprising a body, a cover rigidly affixed thereto, a series of masses slidably mounted in the body, resilient means exerting different forces on the several masses to normally hold them against the cover, and means for indicating the maximum distances moved by the several masses away from the cover during a shock, said means comprising non-resistably deformable material inserts in the body and conical ends on the masses normally touching surfaces of said deformable material in which said ends make depressions in said surfaces of a magnitude in accordance with their maximum displacements.

3. A shock gage for mounting on a body subjected to a rectilinear shock comprising a casing, a series of masses mounted for slidable movement therein in the direction of the applied shock, resilient means exerting a force on each mass against displacement by said shock, each of said forces differing from that of the forces of the resilient means of the other masses, and means for indicating the amount of maximum displacement of each mass during a shock, said means comprising non-resistably deformable material inserts in said casing, and projecting ends on the masses normally resting against the surfaces of said material in which said ends make depressions that can be measured to determine the maximum displacements.

4. A shock gage for mounting on a body subjected to shock, comprising a compact cylindrical casing having a series of bores annularly arranged therein and axially aligned with the direction of the shock force, a mass mounted for sliding movement in each bore, resilient means exerting different forces on each mass in resistance to their displacement by said shock, non-resistably deformable material closing one and the same end of each bore, and a stem on each mass having an obtuse conical formed end with its vertex normally resting against said closure, whereby an indentation in said material may be measured for determination of displacement resulting from said shock.

CHARLES H. GROGAN.
CHARLES E. CREDE.

REFERENCES CITED

The following references are of record in the file of this patent:

UNITED STATES PATENTS

| Number | Name | Date |
| --- | --- | --- |
| 1,397,525 | Kennedy | Nov. 22, 1921 |
| 1,519,473 | Zahm | Dec. 16, 1924 |
| 1,745,522 | Baskerville | Feb. 4, 1930 |
| 2,155,635 | Bennett | Apr. 25, 1939 |
| 2,163,847 | Perrey | June 27, 1939 |

FOREIGN PATENTS

| Number | Country | Date |
| --- | --- | --- |
| 79,385 | Austria | Dec. 10, 1919 |
| 504,657 | Germany | Aug. 12, 1930 |